(12) United States Patent
Takamura

(10) Patent No.: US 9,982,162 B2
(45) Date of Patent: May 29, 2018

(54) CURABLE RESIN COMPOSITION, AND COMPOSITION FOR HARD COAT

(71) Applicant: DAI-ICHI KOGYO SEIYAKU CO., LTD., Kyoto-shi, Kyoto (JP)

(72) Inventor: Naohiro Takamura, Kyoto (JP)

(73) Assignee: DAI-ICHI KOGYOSEIYAKU CO., LTD., Kyoto (JP)

( * ) Notice: Subject to any disclaimer, the term of this patent is extended or adjusted under 35 U.S.C. 154(b) by 0 days. days.

(21) Appl. No.: 15/024,219

(22) PCT Filed: Sep. 8, 2014

(86) PCT No.: PCT/JP2014/073618
§ 371 (c)(1),
(2) Date: Mar. 23, 2016

(87) PCT Pub. No.: WO2015/045823
PCT Pub. Date: Apr. 2, 2015

(65) Prior Publication Data
US 2016/0244634 A1    Aug. 25, 2016

(30) Foreign Application Priority Data
Sep. 27, 2013 (JP) .................................. 2013-201766

(51) Int. Cl.
| | |
|---|---|
| *C08G 63/60* | (2006.01) |
| *C08L 67/00* | (2006.01) |
| *C08L 73/00* | (2006.01) |
| *C08L 77/00* | (2006.01) |
| *C08L 79/00* | (2006.01) |
| *C09D 171/00* | (2006.01) |
| *C08F 2/44* | (2006.01) |
| *C08F 2/48* | (2006.01) |
| *C08F 222/10* | (2006.01) |
| *C08K 3/36* | (2006.01) |

(52) U.S. Cl.
CPC .............. *C09D 171/00* (2013.01); *C08F 2/44* (2013.01); *C08F 2/48* (2013.01); *C08F 222/1006* (2013.01); *C08K 3/36* (2013.01); *C09D 7/40* (2018.01); *C09D 7/61* (2018.01)

(58) Field of Classification Search
None
See application file for complete search history.

(56) References Cited

U.S. PATENT DOCUMENTS

2010/0081070 A1*  4/2010  Taguchi ............... C08K 5/0041
430/7

FOREIGN PATENT DOCUMENTS

| JP | 10-244618 | 9/1998 |
|---|---|---|
| JP | 10-298253 | 11/1998 |
| JP | 2009-84328 | 4/2009 |
| JP | 2011-201930 | 10/2011 |
| JP | 2013-075409 | 4/2013 |
| JP | 2013-177339 | 9/2013 |
| WO | 2009/101974 | 8/2009 |
| WO | 2013/129173 | 9/2013 |

OTHER PUBLICATIONS

Sci-Finder Information Sheet for Alumina.*
Sci-Finder Information Sheet for Titania.*
International Search Report dated Dec. 16, 2014, in application No. PCT/JP2014/073618 with English translation.

\* cited by examiner

*Primary Examiner* — Robert T Butcher
(74) *Attorney, Agent, or Firm* — Wenderoth, Lind & Ponack, L.L.P.

(57) ABSTRACT

The present invention provides a curable resin composition excellent in dispersion stability and capable of bettering various physical properties of hard coating films to be formed through curing, without requiring surface treatment of inorganic microparticles of silica or the like and use of dispersant. The curable resin composition contains an alkylene oxide-modified dipentaerythritol (meth)acylate and, as dispersed therein, surface-untreated inorganic microparticles having a mean particle size of from 1 to 150 nm. A ratio of inorganic microparticles in a total weight of these is from 10 to 45% by weight and a content of solvent is 1% by weight or less.

10 Claims, No Drawings

CURABLE RESIN COMPOSITION, AND COMPOSITION FOR HARD COAT

TECHNICAL FIELD

The present invention relates to a curable resin composition and a composition for hard coating that contain hard inorganic microparticles of silica, zirconia or the like at a high concentration. In particular, it relates to those which are solventless and can cure instantaneously through irradiation with active energy rays such as ultraviolet rays (UV) and electron beams (EB), in which the inorganic microparticles are not surface-treated.

BACKGROUND ART

For performing hard coating on the surfaces of electronic/electric devices or various plastic materials for imparting scratch resistance or the like thereto, compositions containing an energy ray-curable resin and hard (especially having a Mohs hardness of 6 or more) inorganic microparticles have heretofore been investigated.

The UV-curable resin concretely described in PTL 1 contains, for the purpose of protecting the display surface of liquid-crystal displays, a polyfunctional urethane acrylate, surface-treated silica microparticles that have been prepared by introducing a reactive group into the surfaces of microparticles of colloidal silica by methacrylic acid or the like, and a relatively large amount of an organic solvent. On the other hand, PTL 2 describes use of a UV-curable resin that contains zinc antimonate microparticles for antistatic, a dispersant, a polyfunctional acrylate compound such as dipentaerythritol hexaacrylate, and an organic solvent such as toluene. In this, "a dispersant of an ethylene oxide (EO)/propylene oxide (PO) adduct of an amine" is said to be an indispensable component (claim 1).

On the other hand, PTL 3 describes preparation of "a curable composition prepared by blending a silica-based polycondensation product (a) obtained through two-stage hydrolysis and polycondensation, in the presence of colloidal silica having a mean particle size of 1 to 100 nm, of a γ-methacryloyloxypropyltrimethoxysilane or the like (a-1) and a phenyltrimethoxysilane or the like (a-2), a polyfunctional (meth)acrylate (d) and an initiator (e)", and carrying out "each reaction for the production at 45 to 100° C. for 3 to 24 hours" (abstract). In Examples in PTL 3, one prepared by adding bis(4-methacryloyloxyethoxyphenyl)propane and triethylene glycol dimethacrylate to a liquid in which the "silica-based polycondensation product (a)" is dispersed in an organic solvent, followed by distillation of volatile components under reduced pressure is used as a curable composition.

On the other hand, PTL 4 proposes one containing an alkylene oxide-modified dipentaerythritol (meth)acrylate as an energy ray-curable resin for use for a resist resin or the like. On the other hand, PTL 5 shows "an active energy ray-curable composition for hard coating, characterized by containing silica whose surface has been hydrophobized, and a dispersant prepared by reacting a (meth)acrylic acid-(meth)acrylic acid ester copolymer with 3,4-epoxycyclohexylmethyl (meth)acrylate" (abstract). PTL 6 describes producing an organic solvent-dispersed silica sol, then dispersing it in an ester-modified epoxy resin and thermally curing it.

CITATION LIST

Patent Literatures

PTL 1: JP-A 2009-084328
PTL 2: JP-A 10-244618
PTL 3: JP-A 10-298253
PTL 4: JP-A 2013-177339
PTL 5: JP-A 2011-201930
PTL 6: WO2009/101974 (republication)

SUMMARY OF INVENTION

Technical Problem

It is considered that all the energy ray-curable resins for hard coating described in the above-mentioned PTLs 1 to 3 and 5 would need at least one of (1) a relatively large quantity of an organic solvent, (2) surface treatment for silica and (3) a dispersant, for uniformly dispersing silica microparticles in the resin. In Examples in PTL 1, an organic solvent in an amount of two times by weight of the curable resin component is used and silica microparticles with an acryloyl group or the like introduced thereinto are used. In Examples in PTLs 2 and 5, a large quantity of an organic solvent in a similar manner and a dispersant are used. In particular, Comparative Example 3 in PTL 5 demonstrates that, as for the organic solvent-dispersed colloidal silica (organosilica sol), in the case where a surface treatment thereof has not been performed, scratch resistance thereof was poor though the haze value thereof was low (Table 1). Though not containing an organic solvent, PTL 3 needs relatively complicated surface treatment in which silica microparticles are treated by 2-stage reaction to give "silica-based polycondensation product (a)".

It is presumed that the compositions for hard coating in those conventional techniques could not always be sufficient also in point of the properties thereof after curing. PTL 1 says that curling resistance, high hardness and cracking resistance could have been attained, and the hardness thereof has reached a certain numerical level. However, even in Examples demonstrating the best case, the curling of the thin film substrate is 10 mm and is extremely large, and therefore in this, it could not be said that the film curling could be prevented. In addition, it may be said that the cracking resistance is still insufficient. Further, resin compositions with inorganic particles dispersed therein have become problematic in point of the pot life thereof since the particles may flocculate and aggregate with time; however, no evaluation results relating to stable dispersion of such inorganic particles are shown.

On the other hand, PTL 2 needs a dispersant as an indispensable ingredient for stable dispersion, and the influence of the dispersant on appearance such as haze is investigated as a parameter; however, the influence thereof on flex resistance is not clear. The same could apply to PTL 5. On the other hand, PTL 3 discloses that the resin dispersion of inorganic microparticles eventually having been subjected to solvent removal could have good flowability or the like, but has no concrete description relating to the stability and the viscosity of the dispersion. Consequently, there is a probability that the dispersion would not be always satisfactory in these points. In addition, though a polyfunctional (meth)acrylate is referred to, bis(4-methacryloyloxyethoxyphenyl)propane that is bifunctional is used in Examples, and triethylene glycol dimethacrylate is necessarily contained. From this, there is a probability that the resultant composition could not always be said to be hydrophobic and the adhesiveness of the film to be formed through curing to a hydrophobic substrate would not always be sufficient.

The present invention has been made in consideration of the above, and is to provide those excellent in dispersion stability and capable of bettering various physical properties of hard coating films to be formed through curing, without requiring surface treatment of inorganic microparticles of silica or the like and use of a dispersant.

Solution to Problem

The present inventor has assiduously studied for the purpose of solving the above-mentioned problems and have tried a simple method of using, as a crosslinkable monomer to constitute an energy ray-curable resin component, an alkylene oxide-modified dipentaerythritol (meth)acrylate that is a modified dipentaerythritol (meth)acrylate having a suitably small addition molar number of the alkylene oxide, and adding, to the crosslinkable monomer, a dispersion prepared by dispersing inorganic microparticles having a mean particle size of from 1 to 150 nm such as organosilica sol in an organic solvent, mixing them so that the weight ratio of the crosslinkable monomer to the inorganic microparticles could fall within a specific range, and then removing the organic solvent under reduced pressure. With that, quite surprisingly, the inventor has found that the inorganic microparticles can be uniformly and stably dispersed and a good one as a composition for hard coating can be obtained. Specifically, an unexpectedly excellent result has been obtained by employing the method of selecting a specific (meth)acrylate compound, mixing the compound and an organosilica sol while controlling the weight ratio of the compound to inorganic microparticles so as to fall within a specific range, and then removing the solvent. With reference to the above-mentioned prior-art techniques for compositions for hard coating, the present inventor has overcome the preconception that surface treatment for inorganic microparticles and use of a dispersant are indispensable for uniformly and stably dispersing inorganic microparticles in an energy ray-curable resin, and have completed the present invention in the manner as above.

That is, the curable resin composition and the composition for hard coating of the present invention contain an alkylene oxide-modified dipentaerythritol (meth)acrylate having a structure represented by the following general formulae (I) and (II), and, as dispersed therein, inorganic microparticles having a mean particle size of from 1 to 150 nm, in which a ratio of the inorganic microparticles in a total weight of these is from 10 to 45% by weight. Particularly, the surfaces of the inorganic microparticles substantially do not have a hydrophobic group or a reactive group and the compositions substantially do not contain a dispersant other than a (meth)acrylate compound.

[Chem. 1]

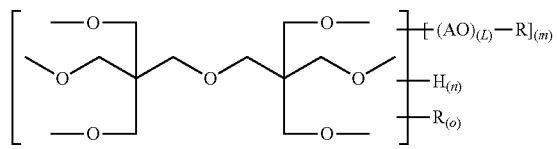

(I)

[Chem. 2]

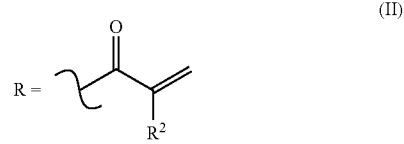

(II)

In the general formula (I), R represents a substituent represented by the general formula (II), AO indicates one kind or two or more kinds selected from alkylene oxide units represented by —CH$_2$CH$_2$O—, —CH$_2$CH(CH$_3$)O—, —CH$_2$CH$_2$CH$_2$CH$_2$O—, and —CH$_2$CH(C$_2$H$_5$)O—, L indicating a mean degree of polymerization of added alkylene oxide chains is $0 < L \leq 5$, a mean value of m is more than 0 and 5 or less, a mean addition molar number L×m of alkylene oxides is $0 < L \times m \leq 5$, n is 1 or 2, a mean value of o is 0 or more and 6 or less, and a total value of m, n and o is 6. In the general formula (II), R$^2$ represents a hydrogen atom or a methyl group.

Advantageous Effects of Invention

The curable resin composition and the composition for hard coating, which contain inorganic microparticles, according to the present invention can save the step and the cost for performing surface treatment of inorganic microparticles in advance. In addition, addition of a solvent, a monofunctional monomer and a non-crosslinkable dispersant compound that are added for uniform and stable dispersion and for viscosity reduction and viscosity control is unnecessary or the content thereof can be significantly reduced. Further, from these, the concentration of the (meth) acryloyl group that is a polymerizable functional group in the reactive composition can be increased, and after curing, good mechanical strength can be maintained.

DESCRIPTION OF EMBODIMENTS

The curable resin composition containing inorganic microparticles and the composition for hard coating, which contain inorganic microparticles, according to the present invention contain a crosslinkable monomer having a structure represented by the above-mentioned general formulae (I) and (II), and as dispersed therein, inorganic microparticles having a mean particle size of from 1 to 150 nm, in which the ratio of the inorganic microparticles in the total weight of these is from 10 to 45% by weight, preferably from 15 to 45% by weight. Preferably, a hydrophobic group or a reactive group does not substantially bond to the surface of the inorganic microparticles, and a component having an action of dispersing the inorganic microparticles is substantially the above-mentioned crosslinkable monomer alone. Here, the inorganic microparticles are substantially non-porous and non-hollow particles, and have a specific surface area diameter obtained by a measurement according to a nitrogen adsorption method (BET method) being from 1 to 150 nm, preferably from 1 to 100 nm, more preferably from 10 to 80 nm, and even more preferably from 20 to 70 nm. However, in the case where high transparency is required, it is preferably from about 10 to 30 nm. For measurement of the mean particle size, use can be made of "Monosorb (registered trademark) MS-16 (manufactured by Yuasa Ionics)" described in the paragraph 0074 of the above-mentioned PTL 6. In the curable resin composition and the composition for hard coating, the content of the crosslinkable monomer is preferably from 25 to 85% by weight and more preferably from 30 to 80% by weight.

Preferably, the curable resin composition containing inorganic microparticles and the composition for hard coating, which contain inorganic microparticles, according to the present invention do not contain a solvent at all. Even when a solvent is contained, the content thereof is preferably 3% by weight or less, more preferably 1% by weight or less, even more preferably 0.3% by weight or less, and still more preferably 0.1% by weight or less. Also preferably, any nonreactive dispersant compound not having reactivity with the crosslinkable monomer is not contained at all. Even when the compound is contained, the content thereof is preferably 3% by weight or less, more preferably 1% by weight or less, even more preferably 0.3% by weight or less, and still more preferably 0.1% by weight or less. The curable resin composition containing inorganic microparticles and the composition for hard coating, which contain inorganic microparticles, according to the present invention have a viscosity at 25° C. of preferably from 300 to 10,000 mPas and more preferably from 500 to 9000 mPas. The measurement of the viscosity may be performed according to JIS K 5600-2-3.

Especially, the curable resin composition containing inorganic microparticles and the composition for hard coating, which contain inorganic microparticles, according to the present invention are curable through irradiation with active energy rays such as UV rays, electron beams, blue visible light rays and gamma rays. In the case where UV rays are used, a light source containing light that falls within a wavelength range of from 150 to 450 nm may be used, and if desired, a photopolymerization initiator may be contained. Combined use of heat from IR rays, far-IR rays, hot air, high-frequency heating or the like is employable here. In the curable resin composition containing inorganic microparticles and the composition for hard coating, which contain inorganic microparticles, according to the present invention, the ratio of the energy ray-curable component, especially the UV-curable component in the moiety except inorganic microparticles and pigment therein is generally from 70 to 100% by weight, and typically from 80 to 100% by weight. Curing through irradiation with active energy rays, for example, may be carried out almost along with coating, by arranging an irradiation lamp just after the coating roll or the discharge nozzle, or may be carried out after entire surface coating or after completion of coating pattern formation, by setting the subject in an irradiation device.

<Alkylene Oxide-Modified Dipentaerythritol (Meth)Acrylate>

The curable resin composition containing inorganic microparticles and the composition for hard coating, which contain inorganic microparticles, according to the present invention contain a structure represented by the above-mentioned general formulae (I) and (II) as the crosslinkable monomer therein. In the formula (I), AO indicates an alkylene oxide unit represented by —$CH_2CH_2O$—, —$CH_2CH(CH_3)O$—, —$CH_2CH_2CH_2CH_2O$—, or —$CH_2CH(C_2H_5)O$—. Specifically, indicated is any of an ethylene oxide (EO) unit, a propylene oxide (PO) unit and a butylene oxide unit, and above all, preferred is an ethylene oxide unit from the viewpoint of viscosity, photosensitivity and polymerization degree. These alkylene oxide units may be present as one kind alone or may be present as combination of two or more kinds.

The mean addition molar number (L×m) of alkylene oxides per 1 mole of dipentaerythritol is more than 0 and 5 or less and from 3 to 5. When the mean addition molar number of alkylene oxides is smaller than the range, the function of reducing the viscosity of the crosslinkable monomer or the like would be insufficient. When the number is larger than the range, the viscosity of the crosslinkable monomer would be rather large, and the amount of the monofunctional (diluting) monomer to be incorporated must be increased. In addition, the crosslinking density lowers by the prolongation of the alkylene oxide chain, and therefore the strength of the cured product lowers. On the other hand, L indicating the mean degree of polymerization of added alkylene oxide chains is $0<L\leq 5$ and preferably $1\leq L\leq 3$. The mean value of m is more than 0 and 6 or less, preferably more than 0 and 5 or less and more preferably 1 or more and 2 or less. The mean value of n indicating the remaining hydroxyl groups is 0 or more and less than 6, preferably 1 or more and 2 or less and more preferably 1 or 2. The mean value of o is 0 or more and 6 or less, preferably 0 or more and less than 6 and more preferably 0 or more and 4 or less. The total of these m, n and o is 6.

R represents a (meth)acryloyl group represented by the general formula (II), and $R^2$ in the general formula (II) is a hydrogen atom or a methyl group and the waved line indicates a bonding part.

Specifically, the above-mentioned crosslinkable monomer has a structure in which a part or all of six hydroxyl groups of dipentaerythritol are converted into (meth)acrylic acid ester groups represented by the general formula (II) via spacers of ethylene oxide, propylene oxide, butylene oxide, or plural types of these. In this, one or two hydroxyl groups not having a (meth)acrylic acid ester group remain as hydrophilic groups, and therefore contribute toward adhesion to various types of substrates or the like.

<Production Method for Alkylene Oxide-Modified Dipentaerythritol (Meth)Acrylate>

The crosslinkable monomer may be produced, for example, according to the method mentioned below, but the production route is not specifically limited and any production method is employable.

The alkylene oxide modification method using dipentaerythritol as a source material may be selected in any desired manner. As a general method, there is mentioned a method of using an alkylene oxide such as ethylene oxide, propylene oxide or butylene oxide and, in addition thereto, there are also mentioned a method of using a cyclic carbonate such as ethylene carbonate, propylene carbonate or butylene carbonate, and a method of using ethylene chlorohydrin.

In the production method to be mentioned below, the (meth)acrylic acid compound that is used as a source material for the crosslinkable monomer has high polymerizability, and therefore during production or during storage of products, a polymerization inhibitor may be suitably used for preventing the polymerization from proceeding. The polymerization inhibitor includes hydroquinones such as p-benzoquinone, hydroquinone, hydroquinone monomethyl ether, and 2,5-diphenyl-parabenzoquinone, N-oxy radicals such as tetramethylpiperidinyl-N-oxy radical (TEMPO), substituted catechols such as t-butylcatechol, amines such as phenothiazine, diphenylamine and phenyl-β-naphthylamine, cupferron, nitrosobenzene, picric acid, molecular oxygen, sulfur, and copper(II) chloride. Of those, preferred are hydroquinones, phenothiazine and N-oxy radicals from the viewpoint of the general versatility and the polymerization inhibiting effect.

Regarding an amount of the polymerization inhibitor to be added, relative to the intended compound represented by the general formula (I), a lower limit is about 10 ppm or more and preferably 30 ppm or more, and an upper limit is generally 5000 ppm or less and preferably 1000 ppm or less. In case the amount is too small, then a sufficient polymerization inhibiting effect could not be expressed and there is a risk of progression of polymerization during production and during storage of products, and in case too large, then on the contrary, there is a risk of inhibiting the curing and polymerization reaction. Consequently, in the compound of the present invention alone or in the polymerizable resin composition thereof, there may be a risk of occurring reduction in the photosensitivity, crosslinking failure of cured products, degradation of the physical properties such as the mechanical strength, or the like, and it is not preferred.

An ordinary method for (meth)acrylic acid ester group introduction in producing the crosslinkable monomer includes an interesterification method that uses a (meth) acrylic acid ester corresponding to the intended structure such as methyl acrylate or methyl methacrylate, an acid chloride method that uses a (meth)acrylic acid chloride, a method using a condensing agent such as N,N'-dicyclohexylcarbodiimide, 2-chloro-1,3-dimethylimidazolium chloride, propanephosphonic acid anhydride, carbonyldiimidazole (CDI), or WSCD (water-soluble carbodiimide), and a dehydration esterification method of azeotropic dehydration with (meth)acrylic acid in the presence of an acid catalyst. For typical esterification of an alkylene oxide-modified dipentaerythritol, possible conditions in production are mentioned below.

The reaction can be carried out by reacting (meth)acrylic acid and an alkylene oxide-modified dipentaerythritol in the presence of an acid catalyst while the formed water is distilled away. The acid to be used is not specifically limited, and may be any acid usable in ordinary esterification. For example, there are mentioned inorganic acids such as sulfuric acid and hydrochloric acid, organic sulfonic acids such as p-toluenesulfonic acid, methanesulfonic acid and camphorsulfonic acid, acid-type ion-exchange resins, Lewis acids such as boron fluoride/ether complex, water-soluble Lewis acids such as lanthanide triflate, and the like. These acids can be used as one alone or as two or more types of arbitrary acids mixed.

Regarding the amount of the acid to be used, relative to alkylene oxide-modified dipentaerythritol as a substrate, a lower limit is 0.1 molar equivalent or more and preferably 0.5 molar equivalent or more. On the other hand, an upper limit is not specifically limited, but is generally 20 molar equivalents or less and preferably 10 molar equivalents or less. In the case the amount of the acid catalyst is too small, such is unfavorable since the reaction progress would be slow or the reaction may stop, and in case too large, some problems such as product discoloration or catalyst residue and some unfavorable side reaction such as production of Michael adducts tend to occur.

The reaction may be carried out in solvent-based system or non-solvent-based system, but in view of side product formation and of handleability in the process, solvent-based system is preferred. In case the solvent is used, the solvent to be used is not specifically limited, but preferably used is an aromatic hydrocarbon solvent such as toluene and xylene, an aliphatic hydrocarbon solvent such as hexane and heptane, an ether solvent such as diethyl ether, tetrahydrofuran, monoethylene glycol dimethyl ether, and diethylene glycol dimethyl ether, a halogen solvent such as methylene chloride, chloroform and carbon tetrachloride, and the like. These solvents may be used as one alone or as plurality of arbitrary solvents mixed.

In case the solvent is used, the amount thereof may be so adjusted that the concentration of a source material, alkylene oxide-modified dipentaerythritol therein could be generally 1% by mass or more and preferably 20% by mass or more. An upper limit is not specifically limited, but is generally 80% by mass or less and preferably 70% by mass or less. The reaction is carried out generally at a temperature equal to or higher than the boiling point of the solvent used while the formed water is distilled away. However, in case where the reaction using the above-mentioned (meth)acrylic acid chloride or the condensing agent is carried out, the reaction may be carried out at a temperature equal to or lower than the boiling point of the solvent or with cooling with ice. The reaction time may be selected in any desired manner. By measuring the amount of the formed water and the acid value inside the system, the end point of the reaction can be recognized.

Regarding the reaction time, a lower limit is generally 30 minutes or more and preferably 60 minutes or more, and an upper limit is, though not specifically limited, generally 20 hours or less and preferably 10 hours or less.

<Purification Method>

The compound produced through the above-mentioned reaction and represented by the general formula (I) may be purified in any purification method heretofore employed, with no specific limitation thereon. For example, there may be mentioned a distillation method, a recrystallization method, an extraction washing method, an adsorption treatment method, and the like. In the case where distillation is performed, the mode thereof may be arbitrary selected from single distillation, precision distillation, thin film distillation, molecular distillation, and the like.

<Method for Storage of (Meth)Acrylic Acid Ester Monomer>

The crosslinkable monomer is polymerizable and is therefore desired to be stored in a cold and dark place. For preventing polymerization, the above-mentioned polymerization inhibitor may be used in the above-mentioned amount for storage.

<Inorganic Microparticles>

The inorganic microparticles are composed of a material having a Mohs hardness of preferably 5 or more and more preferably 6 or more. As the inorganic microparticles, silica, zirconia, alumina, and the like are preferred. As the case may be, however, use can be made of metal oxide microparticles of such as titania, zinc oxide, germanium oxide, indium oxide, tin oxide, indium tin oxide (ITO), antimony oxide, or cerium oxide, and metal fluoride microparticles of such as magnesium fluoride or sodium fluoride. Hollow silica microparticles may be suitably added, and in the case where antistatic characteristic or electroconductivity is desired to be given, indium tin oxide (ITO), tin oxide or the like may be suitably added. Also if desired, a pigment or a dye as a colorant component, or a metal micropowder for imparting electroconductivity may be contained, or in the case where the pigment is used, if desired, a pigment dispersion may be contained.

In one preferred embodiment, the inorganic microparticles are colloidal silica. For synthesis of colloidal silica, there are known a vapor-phase synthesis method for Aerosil synthesis through thermal decomposition of silicon tetrachloride, a method using water glass as the source material, a liquid-phase synthesis method of hydrolysis of an alkoxide, and the like, and any of these is employable. However, synthesis from a liquid-phase silicic acid is preferred, as readily providing spherical, amorphous and mono-dispersed microparticles. Preferred examples of commercial products of colloidal silica include various products of "organosilica sol" (organic solvent-dispersed silica sol) manufactured by Nissan Chemical Industries, Ltd.; and various products of "high-purity organosol" manufactured by Fuso Chemical Co., Ltd. These are ones prepared by dispersing colloidal silica in an organic solvent. Of those, "L Type" (40 to 50 nm) of surface-unmodified "organosilica sols" "general types" is especially preferred. However, "standard type" (10 to 15 nm) of "general types" is also usable. For obtaining colloidal silica dispersed in an organic solvent, a thick silica sol is first prepared by using an ion-exchange resin and ultrafiltration, and then water therein is replaced by an organic solvent, for example, as described in the paragraphs 0075 to 0076 and 0080 in the above-mentioned PTL 6. As the case may be, in place of the organic solvent-dispersed silica sol, a silica sol dispersed in water, for example, various products of "Adelite AT Series" by ADEKA Corporation may also be used. The silica sol may be any one whose acidity of pH in dispersion in water is any of neutral, acid or alkaline.

In a preferred embodiment, the inorganic microparticles are surface-unmodified ones. That is, they are such ones that surface coating through reaction of the surface functional group of the inorganic microparticle with a coupling agent, a reactive monomer or the like is not substantially carried out. For example, they are such ones that 90% or more and especially 95% or more of the surface functional groups such as hydroxyl groups therein are in an unbonding (free) state. Regarding colloidal silica to be obtained from a silicate, they are such ones prepared by forming a sol followed by concentration through ultrafiltration alone, or ones optionally further subjected only to solvent substitution or pH control.

For dispersing inorganic microparticles in an energy ray-polymerizable monomer composed of the above-mentioned crosslinkable monomer (specific alkylene oxide-modified dipentaerythritol (meth)acrylate), a thick silica sol dispersed in an organic solvent (generally having a concentration (solid content) of from 15 to 35%) and the energy ray-polymerizable monomer may be strongly stirred with a stirring blade such as an ordinary screw propeller in a container that enables nitrogen purging or pressure reduction. After the stirring has been finished in some degree, the pressure is reduced and the solvent is removed while continuing the stirring, whereby the organic solvent may be almost completely removed away. For the pressure reduction and solvent removal operation, nitrogen or air may be introduced little by little through a nozzle or the like arranged in the solution to thereby promote solvent removal. Since the viscosity of the above-mentioned alkylene oxide-modified dipentaerythritol (meth)acrylate is low, the solvent removal operation may be carried out at room temperature (18 to 25° C.), but if desired, the system may be heated up to 40° C. or so. In place of adding such a thick silica sol dispersed in an organic solvent and thus mixing and dispersing with the energy-polymerizable monomer in the manner as above, the thick silica sol dispersed in water may be stirred and mixed with the energy-polymerizable monomer and thereafter an organic solvent may be added thereto, and in the same manner as above, water and the organic solvent may be removed.

<Other Energy Ray-Polymerizable Monomers>

Any other crosslinkable monomers may be used along with the above-mentioned crosslinkable monomer, and along with such crosslinkable monomers, a small amount of a non-crosslinkable monomer may be used. In such a case of combination use, the ratio of the above-mentioned crosslinkable monomer in the energy ray-polymerizable monomer may be from 30 to 99% by weight, preferably from 35 to 99% by weight or from 40 to 99% by weight. In the case where a non-crosslinkable (monofunctional) monomer is added, the ratio of the non-crosslinkable monomer in the energy ray-polymerizable monomer may be 10% by weight or less and especially 5% by weight or less. As the monomer to be combined for use herein, use can be made of any one copolymerizable during irradiation with energy rays. Specifically, there are mentioned (meth)acrylates having a carbon number of from 4 to 30, (meth)acrylamides having a carbon number of from 5 to 35, aromatic vinyls having a carbon number of from 5 to 35, vinyl ethers having a carbon number of from 2 to 20, and other radical-polymerizable compounds, etc. Of those, (meth)acrylates and (meth)acrylamides are preferred. In this description, "(meth)acrylate" is meant to indicate both or any one of "acrylate" and "methacrylate".

The other crosslinkable monomer that may be used along with the above-mentioned crosslinkable monomer is preferably a polyfunctional (meth)acrylate monomer having 2 or more polymerizable unsaturated groups in one molecule. The polyfunctional (meth)acrylate monomer includes bifunctional (meth)acrylate compounds such as 1,6-hexanediol di(meth)acrylate, neopentyl glycol di(meth)acrylate, ethylene glycol di(meth)acrylate, and isocyanuric acid ethylene oxide-modified di(meth)acrylate; trimethylolpropane tri(meth)acrylate, and EO- (ethylene oxide, hereinafter referred to as EO), PO- (propylene oxide, hereinafter referred to as PO) or epichlorohydrin-modified products thereof; pentaerythritol tri(meth)acrylate, glycerol tri(meth)acrylate, and EO-, PO- or epichlorohydrin-modified products thereof; trifunctional (meth)acrylate compounds such as isocyanuric acid EO-modified tri(meth)acrylate (Aronix M-315 manufactured by Toagosei Co., Ltd., etc.), tris(meth)acryloyloxyethyl phosphate, phthalic acid hydrogen-(2,2,2-tri-(meth)acryloyloxymethyl)ethyl, glycerol tri(meth)acrylate, and EO-, PO- or epichlorohydrin-modified products thereof; pentaerythritol tetra(meth)acrylate and EO-, PO- or epichlorohydrin-modified products thereof; tetrafunctional (meth)acrylate compounds such as ditrimethylolpropane tetra(meth)acrylate; pentafunctional (meth)acrylate compounds such as dipentaerythritol penta(meth)acrylate, and EO-, PO-, epichlorohydrin-, fatty acid-, alkyl- or urethane-modified products thereof; and hexafunctional (meth)acrylate compounds such as dipentaerythritol hexa(meth)acrylate and EO-, PO-, epichlorohydrin-, fatty acid-, alkyl- or urethane-modified products thereof, and sorbitol hexa(meth)acrylate and EO-, PO-, epichlorohydrin-, fatty acid-, alkyl- or urethane-modified products thereof.

<Other Crosslinkable Energy Ray-Polymerizable Compound Having Molecular Weight of 10,000 or Less>

In addition to the above, use can be made of epoxy(meth)acrylates obtained through addition reaction of a glycidyl ether and (meth)acrylic acid or a carboxylic acid base-having monomer; urethane (meth)acrylates obtained through addition reaction of a reaction product of a polyol and a polyisocyanate, and a hydroxyl group-having (meth)acrylate; polyester acrylates obtained through esterification of a polyester polyol formed of a polyol and a polybasic acid, and (meth)acrylic acid; polybutadiene (meth)acrylates that are (meth)acrylic compounds having a polybutadiene or hydrogenated polybutadiene skeleton; and the like, all of which have a molecular weight of 10,000 or less and preferably 3,000 or less. The urethane (meth)acrylates are preferred as giving hardness and flexibility to cured films. Preferred examples of the (crosslinkable) urethane (meth)acrylates having 2 or more polymerizable unsaturated groups include New Frontier Series R-1901, R-1214, R-1150D, and GX8801A by DKS Co. Ltd. Further mentioned are AH-600, AT-600, UA-306H, UA-306T, UA-306I, and the like, trade names, manufactured by Kyoeisha Chemical Co., Ltd.; UV-1700B, UV-3000B, UV-3200B, UV-6300B, UV-6330B, UV-7000B, and the like, trade names, manufactured by The Nippon Synthetic Chemical Industry Co., Ltd.; Beam Set 500 Series (502H, 504H, 550B, etc.), trade names, manufactured by Arakawa Chemical Industries, Ltd.; U-6HA, U-15HA, UA-32P, U-324A, and the like, trade names, manufactured by Shin-Nakamura Chemical, Co., Ltd.; M-9050 and the like, trade name, manufactured by Toagosei Co., Ltd. The glycidyl ethers for use in the above-mentioned epoxy (meth)acrylates include 1,6-hexanediglycidyl ether, a polyethylene glycol glycidyl ether, a bisphenol A-type epoxy resin, a naphthalene-type epoxy resin, a cardoepoxy resin, glycerol triglycidyl ether, and a phenol-novolak-type epoxy resin. The polyols for use in the urethane (meth)acrylates include 1,6-hexanediglycidyl ether, a polyethylene glycol, a polypropylene glycol, a polytetramethylene glycol, a polycaprolactone diol, a polycarbonate diol, a polybutadiene polyol, and a polyester diol. The polyisocyanates for use in the urethane (meth)acrylates include tolylene diisocyanate, xylylene diisocyanate, diphenylmethane diisocyanate, tetramethylxylene diisocyanate, hexamethylene diisocyanate, isophorone diisocyanate, and dicyclohexylmethane diisocyanate. The hydroxyl group-containing (meth)acrylates for use in the urethane (meth)acrylates include 2-hydroxyethyl (meth)acrylate, 2-hydroxypropyl (meth)acrylate, 4-hydroxybutyl (meth)acrylate, pentaerythritol (meth)acrylate, and caprolactone-modified 2-hydroxyethyl (meth)acrylate. The polyols to form polyester polyols for use in the above-mentioned polyester acrylates include ethylene glycol, a polyethylene glycol, propylene glycol, a polypropylene glycol, neopentyl glycol, 1,4-butanediol, trimethylolpropane, and pentaerythritol; the polybasic acids includes succinic acid, adipic acid, sebacic acid, phthalic acid, isophthalic acid, terephthalic acid, trimellitic acid, and pyromellitic acid. On the other hand, the non-crosslinkable (monofunctional) monomers include (meth)acrylate compounds having a carbon number of from 5 to 35 such as hexyl (meth)acrylate, and (meth)acrylamide compounds having a carbon number of from 5 to 35 such as (meth)acrylamide and N-methyl(meth)acrylamide.

<Polymerization Initiator>

The curable resin composition containing inorganic microparticles and the composition for hard coating, which contain inorganic microparticles, according to the present invention may contain a radical polymerization initiator, a cationic polymerization initiator, a radical and cationic polymerization initiator, etc if necessary. The polymerization initiator includes an energy ray polymerization initiator for radical polymerization or cationic polymerization, and for example, includes compounds containing aromatic ketones, aromatic onium salt compounds, organic peroxides, hexaarylbiimidazole compounds, ketoxime ester compounds, borate compounds, azinium compounds, metallocene compounds, and active ester compounds, etc.

The radical polymerization initiator includes imidazole derivatives, bisimidazole derivatives, N-arylglycine derivatives, organic azide compounds, titanocenes, aluminate complexes, organic peroxides, N-alkoxypyridinium salts, and thioxanthone derivatives, and concretely includes 1,3-di(tert-butyldioxycarbonyl)benzophenone, 3,3',4,4'-tetrakis (tert-butyldioxycarbonyl)benzophenone, 3-phenyl-5-isoxazolone, 2-mercaptobenzimidazole, bis(2,4,5-triphenyl) imidazole, 2,2-dimethoxy-1,2-diphenylethan-1-one (trade name, Irgacure 651, manufactured by Ciba Specialty Chemicals), 1-hydroxy-cyclohexyl-phenyl-ketone (trade name, Irgacure 184, manufactured by Ciba Specialty Chemicals), 2-benzyl-2-dimethylamino-1-(4-morpholinophenyl)-butan-1-one (trade name, Irgacure 369, manufactured by Ciba Specialty Chemicals), and bis(η5-2,4-cyclopentadien-1-yl)-bis(2,6-difluoro-3-(1H-pyrrol-1-yl)-phenyl)titanium) (trade name, Irgacure 784, manufactured by Ciba Specialty Chemicals). Examples of the cationic polymerization initiator include sulfonic acid esters, imide sulfonates, dialkyl-4-hydroxysulfonate salts, arylsulfonic acid-p-nitrobenzyl ester, silanol-aluminium complexes, and (η6-benzene)(η5-cyclopentadienyl)iron(II), concretely including benzoin tosylate, 2,5-dinitrobenzyl tosylate and N-tosylphthalic acid imide. On the other hand, examples of those capable of being used as a radical polymerization initiator and also as a cationic polymerization initiator include aromatic iodonium salts, aromatic sulfonium salts, aromatic diazonium salts, aromatic phosphonium salts, triazine compounds, and iron arene complexes, more concretely including iodonium salts such as chlorides, bromides, borofluorides, hexafluorophosphates, hexafluoroantimonates, or the like of iodoniums such as diphenyl iodonium, ditolyl iodonium, bis(p-tert-butylphenyl) iodonium, bis(p-chlorophenyl) iodonium, or the like; sulfonium salts such as chlorides, bromides, borofluorides, hexafluorophosphates, hexafluoroantimonates, or the like of sulfoniums such as triphenylsulfonium, 4-tert-butyltriphenylsulfonium, tris(4-methylphenyl) sulfonium, or the like; 2,4,6-substituted-1,3,5-triazine compounds such as 2,4,6-tris(trichloromethyl)-1,3,5-triazine, 2-phenyl-4,6-bis(trichloromethyl)-1,3,5-triazine, and 2-methyl-4,6-bis(trichloromethyl)-1,3,5-triazine.

The amount to be used of the polymerization initiator with active energy rays may be selected in accordance with known polymerization reaction. For example, the radical polymerization initiator may be properly used generally in an amount of from 0.0001 to 10 parts by weight and preferably from 0.001 to 5 parts by weight relative to the total amount of the active energy ray-polymerizable monomers. Regarding the temperature in curing reaction, the lower limit is generally 0° C. or higher and preferably 10° C. or higher, while on the other hand, the upper limit thereof is generally 200° C. or lower and preferably 100° C. or lower.

<Other Components>

The curable resin composition containing inorganic microparticles and the composition for hard coating, which contain inorganic microparticles, according to the present invention may contain, if necessary, from 5 to 10% by weight of an adhesion-imparting agent (silane coupling agents, etc.) or a sensitizer, as well as from 1 to 5% by weight of a solvent, etc. Further, depending on the intended use thereof, the compositions may contain an antiglare agent such as plastic beads, a defoaming agent, a leveling agent, a thixotropic agent, a slip agent, a flame retardant, an antistatic agent, an antioxidant, a UV absorbent, etc. The adhesion-imparting agent includes γ-aminopropyltrimethoxysilane, γ-aminopropyltriethoxysilane, vinyltriethoxysilane, γ-glycidoxypropyltriethoxysilane, γ-methacryloxypropyltrimethoxysilane, urea-propyltriethoxysilane, tris(acetylacetonate)aluminium, and acetylacetate aluminium diisopropylate. The sensitizer includes ketocoumarin, fluorene, thioxanthone, diethylthioxanthone, isopropylthioxanthone, anthraquinone, naphthiazoline, biacetyl, benzyl and their derivatives, perylene, and substituted anthracenes.

The organic solvent for use in mixing inorganic microparticles, as being dispersed therein, with an energy ray-polymerizable monomer, for example, in the case of using an organic solvent-dispersed silica sol, and the organic solvent capable of remaining in the curable resin composition and the composition for hard coating include alcohols such as methanol, ethanol, isopropyl alcohol, butanol, isobutyl alcohol, methyl glycol, methyl glycol acetate, methyl cellosolve, ethyl cellosolve, and butyl cellosolve; ketones such as acetone, methyl ethyl ketone, methyl isobutyl ketone, cyclohexanone, and diacetone alcohol; esters such as methyl formate, methyl acetate, ethyl acetate, ethyl lactate, and butyl acetate; nitrogen-containing compounds such as nitromethane, N-methylpyrrolidone and N,N-dimethylformamide; ethers such as diisopropyl ether, tetrahydrofuran, dioxane, and dioxolane; halogenohydrocarbons such as methylene chloride, chloroform, trichloroethane, and tetrachloroethane; other substances such as dimethyl sulfoxide and propylene carbonate; and mixtures thereof. More preferred solvents are methyl acetate, ethyl acetate, butyl acetate, methyl ethyl ketone, etc.

<Coating and Film>

The curable resin composition containing inorganic microparticles and the composition for hard coating, which contain inorganic microparticles, according to the present invention may be applied onto a substrate according to various methods such as a spin coating method, a dipping method, a spraying method, a slide coating method, a bar coating method, a roll coater method, a meniscus coater method, a flexoprinting method, a screen printing method, and a bead coater method. As the case may be, the compositions may be applied onto a specific area alone according to an ink-jetting method. The thickness of the hard coat layer thus formed is, for example, from 1 to 100 µm and preferably from 5 to 30 µm. When the hard coat layer is too thin, the scratch resistance of the hard coat layer is insufficient, but on the other hand, when the hard coat layer is too thick, the hardness thereof would increase but a crack or a curl is readily generated. The hard coat layer may be formed on various types of thin-film substrates or sheet substrates, especially on a resin film, a resin plate, a thin metal plate, or sheet. In one preferred embodiment, the thin-film substrate (for example, having a thickness of from 0.05 to 0.3 mm) or the sheet substrate is transparent, and is used for displays or window plates. The substrate to form the thin-film substrate or the like includes a film or a sheet formed of triacetate cellulose (TAC), diacetyl cellulose, acetate propionate cellulose, acetate butyrate cellulose, a polyethylene terephthalate (PET), a cyclic polyolefin, a polyether sulfone, a (meth) acrylic resin, a polyurethane resin, a polyester, a polycarbonate, a polysulfone, a polyether, trimethylpentene, a polyether ketone, (meth)acrylonitrile, etc. The thin-film substrate on which the hard coat layer is formed is especially a polarizer plate for liquid-crystal displays, a prism sheet, a viewing angle enlarging plate, a protective plate, etc. In preferred examples, the thin-film substrate is an acyl cellulose film for use as a substrate film for polarizer plates for liquid-crystal displays or the like, and is especially a film of triacetate cellulose (TAC).

EXAMPLES

The present invention is described in more detail with reference to the following Examples. Within a range not stepping the scope and the spirit thereof, the present invention is not whatsoever limited by the following Examples. Unless otherwise specifically indicated, "%" is % by mass, and "part" is on a mass basis.

<Analysis of Synthesis Example of Dipentaerythritol EO-Adduct Acrylate>

As for each of the products obtained in the following Synthesis Examples 1 to 3, <liquid chromatography mass spectrometry (hereinafter abbreviated as LC-MS analysis) condition>, the LC-MS analysis for each Synthesis Example was carried out with the following conditions.

LC part: 1100 series manufactured by Agilent Technologies

Column: Inertsil ODS-2 (4.6 mmφ×250 mm, 5 µm)

Eluent: water 80.0%-30 min→0.0%, methanol 20.0%-30 min→100.0%

Column temperature: 40° C.

Flow rate: 1 mL/min

Injection amount: 5 µL (200 ppm methanol solution)

Detector: UV, RI

MS part: JMS T100LP (manufactured by JEOL Ltd.)

Ring lens voltage: 10 V

Ionization method: APCI+

Desolventization chamber temperature: 350° C.

Needle voltage: 2500 V

Orifice 1 temperature: 80° C.

Orifice 1 voltage: 60 V

Ion guide peak-to-peak voltage: 1000 V

Orifice 2 voltage: 5 V

<Condition for Measurement of Hydroxyl Value (OH Value)>

Acetic acid and pyridine were mixed in a weight ratio of 1:9 to prepare an acetylation reagent. A sample was weighed and put in a flask, and the acetylation reagent was added thereto and heated at 80° C. for 2 hours. After the reaction, titration was performed with an aqueous 1 mol/L potassium hydroxide solution by using phenolphthalein as an indicator.

<NMR Analysis>

For the results of NMR analysis, attribution of each peak is indicated by the numbers ((1) to (3)) shown in the following formula.

[Chem. 3]

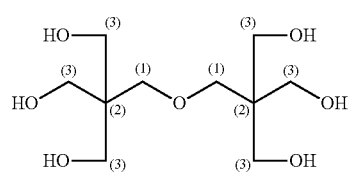

<$^{13}$C-NMR Analysis (400 MHz) of EO Adduct Acrylate, in CDCl$_3$>

45 ppm: derived from (2)

60 ppm: derived from (3)

61 to 63 ppm: derived from ethylene oxide-added (3)

68 to 73 ppm: derived from ethylene oxide added to (3)

77 to 79 ppm: derived from heavy chloroform 128 to 131 ppm: derived from ester-bonded acrylic acid 165 to 167 ppm: ester bond part <$^1$H-NMR Analysis (400 MHz) of EO Adduct Acrylate, in CDCl$_3$>

3.3 to 4.1 ppm (16H): derived from (1) and (3)

3.6 to 4.4 ppm (8H): derived from ethylene oxide added to OH in (3)

5.7 to 6.4 ppm (18H): derived from double bond of acrylic acid ester 7.3 ppm: derived from heavy chloroform <LC-MS Analysis of EO Adduct Acrylate>
8.8 to 11.5 min: ethylene oxide polymer diacrylate
14 to 16 min: dipentaerythritol ethylene oxide-modified monoacrylate
16 to 20 min: dipentaerythritol ethylene oxide-modified hexaacrylate Synthesis Example 1: Dipentaerythritol 3EO Adduct Acrylate In an autoclave having a volume of 1 L and equipped with a stirrer were charged 254 g (1.0 mol) of dipentaerythritol (manufactured by Koei Chemical Co., Ltd., OH value 1324), 127 g of toluene and 0.3 g of KOH, followed by heating up to 90° C. and stirring to give a slurry liquid. Next, this was heated up to 130° C., and 176 g (4 mol) of ethylene oxide was gradually introduced into the autoclave and subjected to a reaction. Along with the introduction of ethylene oxide, the inner temperature of the autoclave was increased. This was cooled as needed so as to keep the reaction temperature at 140° C. or less. After the reaction, this was depressurized to 10 mmHg or less of mercury at 140° C. to thereby remove the excessive ethylene oxide and by-product ethylene glycol polymer. Subsequently, this was neutralized with acetic acid to have a controlled pH of from 6 to 7. The OH value of the resultant dipentaerythritol 3EO adduct was 897.

Into a four-neck glass flask were charged 375 g (1 mol) of the resultant ethylene glycol-modified dipentaerythritol (OH value 897), 562 g (7.8 mol) of acrylic acid, 46 g of paratoluenesulfonic acid, 900 g of toluene, and 0.9 g of hydroquinone, followed by being subjected to a reaction under heat while an air blow was introduced thereinto. Water formed through the reaction was removed out of the system as needed through azeotropy with toluene. The reaction temperature was from 100 to 110° C., and the amount of the reaction water that had been removed out of the system until the end of the reaction was 112 g. After the reaction, this was washed with alkali and washed with water, the toluene layer as the upper layer was separated, and toluene was evaporated away therefrom under reduced pressure to give 615 g (yield 88%) of dipentaerythritol 3EO adduct acrylate represented by the general formulae (I) and (II).

In regard to the resultant, measurement of hydroxyl value thereof, and analyses through $^1$H-NMR, $^{13}$C-NMR, HPLC, LC-MS, and hydroxyl value were performed, and as a result, it was clarified that the product is a hydroxyl group-containing dipentaerythritol 3EO adduct acrylate.

Synthesis Example 2: Dipentaerythritol 4EO Adduct Acrylate

In an autoclave having a volume of 1 L and equipped with a stirrer were charged 254 g (1.0 mol) of dipentaerythritol (manufactured by Koei Chemical Co., Ltd., OH value 1324), 127 g of toluene and 0.3 g of KOH, followed by heating up to 90° C. and stirring to give a slurry liquid. Next, this was heated up to 130° C., and 220 g (5 mol) of ethylene oxide was gradually introduced into the autoclave and subjected to a reaction. Along with the introduction of ethylene oxide, the inner temperature of the autoclave was increased. This was cooled as needed so as to keep the reaction temperature at 140° C. or less. After the reaction, this was depressurized to 10 mmHg or less of mercury at 140° C. to thereby remove the excessive ethylene oxide and the by-product ethylene glycol polymer. Subsequently, this was neutralized with acetic acid to have a controlled pH of from 6 to 7. The OH value of the resultant dipentaerythritol 4EO adduct was 765.

Into a four-neck glass flask were charged 440 g (1 mol) of the resultant ethylene glycol-modified dipentaerythritol (OH value 765), 562 g (7.8 mol) of acrylic acid, 50 g of paratoluenesulfonic acid, 900 g of toluene, and 1 g of hydroquinone, followed by being subjected to a reaction under heat while an air blow was introduced thereinto. Water formed through the reaction was removed out of the system as needed through azeotropy with toluene. The reaction temperature was from 100 to 110° C., and the amount of the reaction water that had been removed out of the system until the end of the reaction was 113 g. After the reaction, this was washed with alkali and washed with water, the toluene layer as the upper layer was separated, and toluene was evaporated away therefrom under reduced pressure to give 665 g (yield 87%) of dipentaerythritol 4EO adduct acrylate represented by the general formulae (I) and (II).

In regard to the resultant, measurement of hydroxyl value thereof, and analyses through $^1$H-NMR, $^{13}$C-NMR, HPLC, LC-MS, and hydroxyl value were performed, and as a result, it was clarified that the product is a hydroxyl group-containing dipentaerythritol 4EO adduct acrylate.

Synthesis Example 3: Synthesis of Dipentaerythritol 5EO Adduct Acrylate

In an autoclave having a volume of 1 L and equipped with a stirrer were charged 254 g (1.0 mol) of dipentaerythritol (manufactured by Koei Chemical Co., Ltd., OH value 1324), 36 g of distilled water and 0.3 g of KOH, followed by heating up to 90° C. and stirring to give a slurry liquid. Next, this was heated up to 130° C., and 264 g (6 mol) of ethylene oxide was gradually introduced into the autoclave and subjected to a reaction. Along with the introduction of ethylene oxide, the inner temperature of the autoclave was increased. This was cooled as needed so as to keep the reaction temperature at 140° C. or less. After the reaction, this was depressurized to 10 mmHg or less of mercury at 140° C. to thereby remove the excessive ethylene oxide and the by-product ethylene glycol polymer. Subsequently, this was neutralized with acetic acid to have a controlled pH of from 6 to 7. The OH value of the resultant dipentaerythritol 5EO adduct was 706.

Into a four-neck glass flask were charged 477 g (1 mol) of the resultant ethylene glycol-modified dipentaerythritol (OH value 706), 562 g (7.8 mol) of acrylic acid, 52 g of paratoluenesulfonic acid, 900 g of toluene, and 1 g of hydroquinone, followed by being subjected to a reaction under heat while an air blow was introduced thereinto. Water formed through the reaction was removed out of the system as needed through azeotropy with toluene. The reaction temperature was from 100 to 110° C., and the amount of the reaction water that had been removed out of the system until the end of the reaction was 113 g. After the reaction, this was washed with alkali and washed with water, the toluene layer as the upper layer was separated, and toluene was evaporated away therefrom under reduced pressure to give 697 g (yield 87%) of dipentaerythritol 5EO adduct acrylate represented by the general formulae (I) and (II).

In regard to the resultant, measurement of hydroxyl value thereof, and analyses through $^1$H-NMR, $^{13}$C-NMR, and LC-MS were performed, and as a result, it was clarified that the product is a hydroxyl group-containing dipentaerythritol 5EO adduct acrylate.

Example 1: Dipentaerythritol 3EO Adduct Acrylate, 20% Silica

To a four-neck glass flask were added 80 parts of the dipentaerythritol 3EO adduct acrylate obtained in Synthesis Example 1, and 66.7 parts of organosilica sol general-type (product name, MEK-ST L Type, solid content 30%) manufactured by Nissan Chemical Industries, Ltd., which is a methyl ethyl ketone (MEK) dispersion solution of silica microparticles, followed by mixing. Thereafter, while air was kept introduced into the solution through a glass tube, MEK contained in the organosilica sol "MEK-ST" was removed through solvent removal under reduced pressure, thereby giving a solventless (with 0.01% or less of volatile components) microparticles-dispersed curable resin composition containing 20% of silica microparticles.

To 100 g of the thus-obtained microparticles-dispersed curable resin composition was added 3 g (solid content) of Irgacure 184 manufactured by BASF, serving as a photopolymerization initiator, and while kept heated in a hot bath at 60° C., the initiator was melted in the resin. The resin composition was applied onto a PET substrate to be in a thickness of 5 μm by using a bar coater. In a belt conveyor-type UV curing device equipped with a metal halide lamp, this was cured at an integrated dose of 200 mJ/cm$^2$, and subjected to various tests. The PET film used here was Lumirror (T-60, 100 μm) manufactured by Toray Industries, Inc.

Comparative Example 1: Dipentaerythritol 3EO Adduct Acrylate, 0% Silica

By using 100 g of the dipentaerythritol 3EO adduct acrylate obtained in Synthesis Example 1 directly as it was in place of the microparticles-dispersed curable resin composition, tests were performed in the same manner as in Example 1.

Example 2: Dipentaerythritol 3EO Adduct Acrylate, 30% Silica

In the same manner as in Example 1 except that 70 parts of the dipentaerythritol 3EO adduct acrylate obtained in Synthesis Example 1 and 100 parts of MEK-ST L Type were added, a solventless microparticles-dispersed curable resin composition containing 30% of silica microparticles was obtained. By using 100 g of the thus-obtained microparticles-dispersed curable resin composition, tests were performed in the same manner as in Example 1.

Example 3: Dipentaerythritol 3EO Adduct Acrylate, 40% Silica

In the same manner as in Example 1 except that 60 parts of the dipentaerythritol 3EO adduct acrylate obtained in Synthesis Example 1 and 133.3 parts of MEK-ST L Type were added, a solventless microparticles-dispersed curable resin composition containing 40% of silica microparticles was obtained. By using 100 g of the thus-obtained microparticles-dispersed curable resin composition, tests were performed in the same manner as in Example 1.

Comparative Example 2: Dipentaerythritol 3EO Adduct Acrylate, 50% Silica

In the same manner as in Example 1 except that 50 parts of the dipentaerythritol 3EO adduct acrylate obtained in Synthesis Example 1 and 166.7 parts of MEK-ST L Type were added, a solventless microparticles-dispersed curable resin composition containing 50% of silica microparticles was obtained. By using 100 g of the thus-obtained micropar-ticles-dispersed curable resin composition, t tests were performed in the same manner as in Example 1.

Example 4: Dipentaerythritol 4EO Adduct Acrylate, 20% Silica

In the same manner as in Example 1 except that 80 parts of the dipentaerythritol 4EO adduct acrylate obtained in Synthesis Example 2 and 66.7 parts of MEK-ST L Type were added, a solventless microparticles-dispersed curable resin composition containing 20% of silica microparticles was obtained. By using 100 g of the thus-obtained microparticles-dispersed curable resin composition, tests were performed in the same manner as in Example 1.

Comparative Example 3: Dipentaerythritol 4EO Adduct Acrylate, 0% Silica

By using 100 g of the dipentaerythritol 4EO adduct acrylate obtained in Synthesis Example 2 directly as it was in place of the microparticles-dispersed curable resin composition, tests were performed in the same manner as in Example 1.

Example 5: Dipentaerythritol 4EO Adduct Acrylate, 30% Silica

In the same manner as in Example 1 except that 70 parts of the dipentaerythritol 4EO adduct acrylate obtained in Synthesis Example 2 and 100 parts of MEK-ST L Type were added, a solventless microparticles-dispersed curable resin composition containing 30% of silica microparticles was obtained. By using 100 g of the thus-obtained microparticles-dispersed curable resin composition, tests were performed in the same manner as in Example 1.

Example 6: Dipentaerythritol 4EO Adduct Acrylate, 40% Silica

In the same manner as in Example 1 except that 60 parts of the dipentaerythritol 4EO adduct acrylate obtained in Synthesis Example 2 and 133.3 parts of MEK-ST L Type were added, a solventless microparticles-dispersed curable resin composition containing 40% of silica microparticles was obtained. By using 100 g of the thus-obtained microparticles-dispersed curable resin composition, tests were performed in the same manner as in Example 1.

Comparative Example 4: Dipentaerythritol 4EO Adduct Acrylate, 50% Silica

In the same manner as in Example 1 except that 50 parts of the dipentaerythritol 4EO adduct acrylate obtained in Synthesis Example 2 and 166.7 parts of MEK-ST L Type were added, a solventless microparticles-dispersed curable resin composition containing 50% of silica microparticles was obtained. By using 100 g of the thus-obtained microparticles-dispersed curable resin composition, tests were performed in the same manner as in Example 1.

Example 7: Dipentaerythritol 5EO Adduct Acrylate, 20% Silica

In the same manner as in Example 1 except that 80 parts of the dipentaerythritol 5EO adduct acrylate obtained in Synthesis Example 3 and 66.7 parts of MEK-ST L Type were added, a solventless microparticles-dispersed curable resin composition containing 20% of silica microparticles was obtained. By using 100 g of the thus-obtained microparticles-dispersed curable resin composition, tests were performed in the same manner as in Example 1.

Comparative Example 5: Dipentaerythritol 5EO Adduct Acrylate, 0% Silica

By using 100 g of the dipentaerythritol 5EO adduct acrylate obtained in Synthesis Example 3 directly as it was in place of the microparticles-dispersed curable resin composition, tests were performed in the same manner as in Example 1.

Example 8: Dipentaerythritol 5EO Adduct Acrylate, 30% Silica

In the same manner as in Example 1 except that 70 parts of the dipentaerythritol 5EO adduct acrylate obtained in Synthesis Example 3 and 100 parts of MEK-ST L Type were added, a solventless microparticles-dispersed curable resin composition containing 30% of silica microparticles was obtained. By using 100 g of the thus-obtained microparticles-dispersed curable resin composition, this was tested in the same manner as in Example 1.

Example 9: Dipentaerythritol 5EO Adduct Acrylate, 40% Silica

In the same manner as in Example 1 except that 60 parts of the dipentaerythritol 5EO adduct acrylate obtained in Synthesis Example 3 and 133.3 parts of MEK-ST L Type were added, a solventless microparticles-dispersed curable resin composition containing 40% of silica microparticles was obtained. By using 100 g of the thus-obtained microparticles-dispersed curable resin composition, tests were performed in the same manner as in Example 1.

Comparative Example 6: Dipentaerythritol 5EO Adduct Acrylate, 50% Silica

In the same manner as in Example 1 except that 50 parts of the dipentaerythritol 5EO adduct acrylate obtained in Synthesis Example 3 and 166.7 parts of MEK-ST L Type were added, a solventless microparticles-dispersed curable resin composition containing 50% of silica microparticles was obtained. By using 100 g of the thus-obtained microparticles-dispersed curable resin composition, tests were performed in the same manner as in Example 1.

Comparative Example 7: Acrylate of Dipentaerythritol, 0% Silica

Except for using 100 g of DPHA (penta/hexaacrylate mixture of dipentaerythritol) manufactured by Nippon Kayaku Co., Ltd. as it was in place of the microparticles-dispersed curable resin composition, tests were performed in the same manner as in Example 1.

Comparative Example 8: Acrylate of Dipentaerythritol, 10% Silica

In place of the microparticles-dispersed curable resin composition, 90 g of DPHA (penta/hexaacrylate mixture of dipentaerythritol) manufactured by Nippon Kayaku Co., Ltd. was used and 33.4 parts of organosilica sol general-type (product name, MEK-ST L Type, solid content 30%) manufactured by Nissan Chemical Industries, Ltd., which is an MEK dispersion solution of silica microparticles, was added thereto, and in the same manner as in Example 1, a solventless microparticles-dispersed curable resin composition containing 10% of silica microparticles was obtained. Subsequently, this was subjected to initiator addition and physical properties measurement in the same manner as in Example 1.

Comparative Example 9: Acrylate of Dipentaerythritol, 20% Silica

In place of the microparticles-dispersed curable resin composition, 80 g of DPHA (penta/hexaacrylate mixture of dipentaerythritol) manufactured by Nippon Kayaku Co., Ltd. was used and 66.7 parts of organosilica sol general-type (product name, MEK-ST L Type, solid content 30%) manufactured by Nissan Chemical Industries, Ltd., which is an MEK dispersion solution of silica microparticles, was added thereto, and in the same manner as in Example 1, a solventless microparticles-dispersed curable resin composition containing 20% of silica microparticles was obtained. Subsequently, this was subjected to initiator addition and physical properties measurement in the same manner as in Example 1.

Comparative Example 10: Acrylate of Pentaerythritol

Except for using 100 g of PET-30 (tri/tetraacrylate mixture of pentaerythritol) manufactured by Nippon Kayaku Co., Ltd. in place of the microparticles-dispersed curable composition, tests were performed in the same manner as in Example 1.

Comparative Example 11: Acrylate of Pentaerythritol, 10% Silica

In place of the microparticles-dispersed curable resin composition, 90 g of PET-30 (tri/tetraacrylate mixture of pentaerythritol) manufactured by Nippon Kayaku Co., Ltd. was used and 33.4 parts of organosilica sol general-type (product name, MEK-ST L Type, solid content 30%) manufactured by Nissan Chemical Industries, Ltd., which is an MEK dispersion solution of silica microparticles, was added thereto, and in the same manner as in Example 1, a solventless microparticles-dispersed curable resin composition containing 10% of silica microparticles was obtained. Subsequently, this was subjected to initiator addition and physical properties measurement in the same manner as in Example 1.

Comparative Example 12: Acrylate of Pentaerythritol, 20% Silica

In place of the microparticles-dispersed curable resin composition, 80 g of PET-30 (tri/tetraacrylate mixture of pentaerythritol) manufactured by Nippon Kayaku Co., Ltd. was used and 66.7 parts of organosilica sol general-type (product name, MEK-ST L Type, solid content 30%) manufactured by Nissan Chemical Industries, Ltd., which is an MEK dispersion solution of silica microparticles, was added thereto, and in the same manner as in Example 1, a solventless microparticles-dispersed curable resin composition containing 20% of silica microparticles was obtained. Subsequently, this was subjected to initiator addition and physical properties measurement in the same manner as in Example 1.

Comparative Example 13: Trimethylolpropane Triacrylate

Except for using 100 g of A-TMPT (trimethylolpropane triacrylate (TMPTA)) manufactured by Shin-Nakamura Chemical Co., Ltd. in place of the microparticles-dispersed curable composition, tests were performed in the same manner as in Example 1.

Comparative Example 14: Trimethylolpropane Triacrylate, 10% Silica

In place of the microparticles-dispersed curable resin composition, 90 g of A-TMPT (trimethylolpropane triacrylate (TMPTA)) manufactured by Shin-Nakamura Chemical Co., Ltd. was used and 33.4 parts of organosilica sol general-type (product name, MEK-ST L Type, solid content 30%) manufactured by Nissan Chemical Industries, Ltd., which is an MEK dispersion solution of silica microparticles, was added thereto, and in the same manner as in Example 1, a solventless microparticles-dispersed curable resin composition containing 10% of silica microparticles was obtained. Subsequently, this was subjected to initiator addition and physical properties measurement in the same manner as in Example 1.

Comparative Example 15: Trimethylolpropane Triacrylate, 20% Silica

In place of the microparticles-dispersed curable resin composition, 80 g of A-TMPT (trimethylolpropane triacrylate (TMPTA)) manufactured by Shin-Nakamura Chemical Co., Ltd. was used and 66.7 parts of organosilica sol general-type (product name, MEK-ST L Type, solid content 30%) manufactured by Nissan Chemical Industries, Ltd., which is an MEK dispersion solution of silica microparticles, was added thereto, and in the same manner as in Example 1, a solventless microparticles-dispersed curable resin composition containing 20% of silica microparticles was obtained. Subsequently, this was subjected to initiator addition and physical properties measurement in the same manner as in Example 1.

Example 10: Urethane Oligomer+Example 6 (Dipentaerythritol 4EO Adduct Acrylate, 40% Silica)

Into 50 g of urethane oligomer (product name: New Frontier R-1901, 9-functional acrylate) manufactured by DKS Co. Ltd. was mixed 50 g of the inorganic microparticles-dispersed curable resin composition not containing an initiator, which had been prepared in Example 6, and then in the same manner as in Example 1, 3 g of Irgacure 184 was added thereto and the resultant was melted in a hot water bath at 60° C. Subsequently, this was processed in the same manner as in Example 1 for cured film formation and evaluation.

Comparative Example 16: Urethane Oligomer, 0% Silica

Except for using 100 g of urethane oligomer (product name, New Frontier R-1901, 9-functional acrylate) manufactured by DKS Co. Ltd., in place of the inorganic microparticles-dispersed curable resin composition, tests were performed in the same manner as in Example 1.

Comparative Example 17: Urethane Oligomer, 20% Silica

To 80 g of urethane oligomer (product name: New Frontier R-1901, 9-functional acrylate) manufactured by DKS Co. Ltd. was added 66.7 parts of organosilica sol general-type (product name, MEK-ST L Type, solid content 30%) manufactured by Nissan Chemical Industries, Ltd., which is an MEK dispersion solution of silica microparticles, in the same manner as in Example 1, a solventless microparticles-dispersed curable resin composition containing 20% of silica microparticles was obtained. Subsequently, this was subjected to initiator addition and physical properties measurement in the same manner as in Example 1.

Comparative Example 18: Urethane Oligomer, 20% Silica

Into 50 g of urethane oligomer (product name: New Frontier R-1901, 9-functional acrylate) manufactured by DKS Co. Ltd. was mixed 50 g of the inorganic microparticles-dispersed curable resin composition not containing an initiator that had been prepared in Comparative Example 4, and then in the same manner as in Example 1, 3 g of Irgacure 184 was added thereto and the resultant was melted in a hot water bath at 60° C. Subsequently, this was processed in the same manner as in Example 1 for cured film formation and evaluation.

The compositions for hard coating of the above-mentioned Examples 1 to 10 and Comparative Examples 1 to 17 were evaluated as follows.

[Formation of Cured Film]

The compositions for hard coating of Examples 1 to 10 and Comparative Examples 1 to 17 were applied onto the easy-adhesion processed surface of an easy-adhesion processed PET film (manufactured by Toray Industries, Inc., Lumirror T-60, 100 μm) to be in a dry thickness of 5 μm, by using a bar coater. By using a belt conveyor-type UV irradiation device (GS Yuasa, UV system CSN2-40) and a spot UV irradiation device (USHIO Optical Modulex SX-UID500H), this was cured at an integrated dose of 200 mJ/cm$^2$.

[Dispersion Stability of Particles after Solvent Removal]

Each dipentaerythritol AO adduct acrylate, DPHA, PET3, and R-1901, and organosilica sol general type (product name MEK-ST L Type, solid content 30%) manufactured by Nissan Chemical Industries, Ltd. were mixed in a predetermined blending ratio, and subjected to solvent removal according to the respective Synthesis Example, and the outward appearance of the resultant was visually checked.

A: Transparently and uniformly dissolved.
B: Cloudy.
C: Generation of precipitates or aggregates.

[Viscosity]

As for the initial viscosity, each dipentaerythritol AO adduct acrylate, DPHA, PET3, or R-1901, and organosilica sol general type (product name MEK-ST L Type, solid content 30%) manufactured by Nissan Chemical Industries, Ltd. were mixed in a predetermined blending ratio, and subjected to solvent removal according to the respective Synthesis Example, and the viscosity of the resultant was measured according to JIS K 5600-2-3. Each resin after solvent removal was stored in a constant-temperature incubator at 50° C. for 3 months so as to be subjected to heat acceleration, and the viscosity of the resultant was measured to be the dispersion viscosity after the acceleration test.
[Pencil Hardness]

A cured film of each resin was formed, and the film hardness on a PET film was measured according to JIS K5600-5-4.
[Martens Hardness]

By using an ultra-low indentation hardness tester ENT-1100a manufactured by Elionix Inc. and according to a method for ultra-low loaded hardness test of JIS Z2255, the hardness of the resin cured layer formed on a PET film was measured.
[Steel Wool Resistance]

A cured film was formed on an easy-adhesion processed PET film (Lumirror T-60 manufactured by Toray Industries, Inc.) according to the same method as that for the above-mentioned curability evaluation, and rubbed 100 times with #00 steel wool under a load of 500 g, whereupon the condition of the film was visually observed and evaluated according to the following criteria.
  A: No scratch.
  B: About 10 scratches were confirmed on the tested piece.
  C: Many scratches were confirmed.
[Blocking Resistance]

Similarly a cured film was formed on a PET film, and the cured film part was stuck to an uncoated PET film, then a load of 2 kg/cm$^2$ was kept applied thereto at 60° C. for 24 hours, and the films were checked for blocking therebetween.
  A: No blocking.
  B: Blocking occurred.
[Adhesiveness]

As for a cured layer formed of each resin on a PET film, cross-cut peeling test as stipulated in JIS-K5400 was performed and the number of the remaining cross cuts was regarded as the adhesiveness.
[Curling]

A cured film was formed on an easy-adhesion processed PET film (Lumirror T-60 manufactured by Toray Industries, Inc.) having a size of 6×6 cm, according to the same method as that for curability evaluation. One point of the four corners of the film was fixed on a flat plane, and the height of the remaining three points was measured. The average value thereof was regarded as curling.
[Haze of Cured Film]

A PET film with each resin composition formed thereon was measured with a haze meter (Suga Test Instruments, HGM Model).
[Folding Resistance of Cured Film]

According to JIS K 5600, film folding resistance was tested according to a cylindrical mandrel method. For the test, a PET film with a cured film of each resin composition formed thereon was set in such a manner that the film-coated surface thereof could face outside.
[Contamination Resistance]

Lines were drawn on a cured film with oily ink (red, blue and black) as a contaminant, left as such for 18 hours, and then wiped away with ethanol/cotton, whereupon the outward appearance of the film was visually checked and evaluated according to the following criteria.
  A: Not colored.
  B: Colored a little.
  C: Colored thickly.
[Scratch Resistance] (250 g×50 Times)

As for a PET film with a cured film of each resin composition formed thereon, a Taber abrasion test was performed. By using a CS-10F wear ring under 250-g load, the haze after rotated for a predetermined number of rotations was measured with a haze meter (Suga Test Instruments, HGM Model). The difference in the hazes before and after the test was determined.

The following Table 1 shows collectively the results of the above measurements. As known from the results shown in Table 1, the compositions of Examples of the present invention all had good results in all the evaluation items. In addition, since the compositions were stable as having a low viscosity, they realized uniform mixing only by stirring with propellers in an ordinary reaction flask. In other words, no dispersion treatment of ultrasonic treatment, bead mill treatment, etc. was necessary. In particular, even though the solvent that could participate in dispersion stability was removed, stable dispersion could still be maintained and the resin compositions could be therefore solventless.

With the increase in the silica content, the viscosity increased, but the composition with the silica content up to 50% by weight could contain silica microparticles uniformly dispersed without detracting from the transparency of the appearance, even showed some viscosity increase as compared with the case with no silica addition (Comparative Examples 1, 3 and 5), but even in the acceleration test for storage stability, showed no indication for microparticles aggregation such as thickening or gelation, and thus, it was known that the composition exhibits an excellent pot life as a microparticles-dispersed curable resin composition. In the case where the silica content is 50% by weight (Comparative Examples 2, 4 and 6), the viscosity increased much and the adhesiveness was poor. In addition, the folding resistance tended to worsen. On the other hand, in the case with no silica (Comparative Examples 1, 3 and 5), the blocking resistance was poor and the hardness tended to be insufficient.

On the other hand, in the case of using penta/hexaacrylate of dipentaerythritol (DPHA; Comparative Examples 8 and 9), tri/tetra-acrylate mixture of pentaerythritol (Nippon Kayaku's PET-3; Comparative Examples 11 and 12) or trimethylolpropane triacrylate (TMPTA; Comparative Examples 14 and 15), which are a typical polyfunctional acrylates used in conventional microparticles-containing compositions for hard coating, cloudiness was observed in the outward appearance even though the amount of the microparticles therein was 10% or so, which is a low concentration, and therefore transparency needed for optical use could not be secured. Further, when the concentration was increased up to 20%, it was known that the resin flowability was thereby significantly worsened.

TABLE 1

| | Properties of Liquid | | | | | | Properties of Cured Product | | | | | | | | | |
|---|---|---|---|---|---|---|---|---|---|---|---|---|---|---|---|---|
| Ex. | Dispersion Stability of Particles after Solvent Removal | Resin Amount (wt %) | Silica Amount (wt %) | Initial Viscosity (mPa·s/25° C.) | Dispersion Viscosity after Acceleration Test (mPa·s/25° C.) | Pencil Hardness | Martens Hardness (N/mm²) | Steel Wool Resistance | Blocking Resistance | Adhesiveness | Curling (mm) | Haze of Cured Film (%) | Total Light Transmittance of Cured Film | Folding Resistance of Cured Film (mm) (Mandrel Method) | Contamination Resistance |
| Com. Ex. 1 | — | 100 | 0 | 530 | 520 | 2H | 372 | B | C | 90/100 | 8.6 | 1.80 | 89.2 | 5 | A |
| Ex. 1 | A | 80 | 20 | 1100 | 1090 | 3H | 393 | A | A | 100/100 | 5.2 | 1.81 | 89.4 | 4 | A |
| Ex. 2 | A | 70 | 30 | 3600 | 3700 | 4H | 451 | A | A | 100/100 | 5.3 | 1.77 | 89.3 | 4 | A |
| Ex. 3 | A | 60 | 40 | 8800 | 8900 | 4H | 485 | A | A | 100/100 | 5.1 | 1.80 | 89.5 | 2 | A |
| Com. Ex. 2 | A | 50 | 50 | 38,000 | 44,000 | 4H | 490 | A | A | 70/100 | 4.1 | 1.77 | 89.4 | 2 | A |
| Com. Ex. 3 | — | 100 | 0 | 400 | 400 | 2H | 340 | A | C | 100/100 | 3.2 | 1.7 | 89.4 | 3 | A |
| Ex. 4 | A | 80 | 20 | 800 | 810 | 2H | 370 | A | A | 100/100 | 3.0 | 1.72 | 89.4 | 2 | A |
| Ex. 5 | A | 70 | 30 | 2900 | 2950 | 3H | 430 | A | A | 100/100 | 2.8 | 1.73 | 89.2 | 2 | A |
| Ex. 6 | A | 60 | 40 | 8000 | 8200 | 4H | 460 | A | A | 100/100 | 2.4 | 1.72 | 89.5 | 2 | A |
| Com. Ex. 4 | A | 50 | 50 | 240,000 | 260,000 | 4H | 465 | A | A | 70/100 | 2.0 | 1.72 | 89.6 | 1 | A |
| Com. Ex. 5 | — | 100 | 0 | 310 | 320 | H | 319 | A | C | 100/100 | 5.1 | 1.3 | 90.1 | 2 | A |
| Ex. 7 | A | 80 | 20 | 620 | 610 | 2H | 344 | A | A | 100/100 | 3.3 | 1.33 | 89.9 | 2 | A |
| Ex. 8 | A | 70 | 30 | 1700 | 1740 | 2H | 413 | A | A | 100/100 | 2.9 | 1.31 | 90.0 | 2 | A |
| Ex. 9 | A | 60 | 40 | 6500 | 6530 | 3H | 430 | A | A | 100/100 | 2.8 | 1.35 | 90.2 | 1 | A |
| Com. Ex. 6 | A | 50 | 50 | 210,000 | 230,000 | 3H | 438 | A | A | 70/100 | 2.6 | 1.33 | 90.0 | 1 | A |
| Com. Ex. 7 | — | 100 | 0 | 7200 | 7200 | 4H | 462 | A | C | 100/100 | 15.2 | 1.6 | 90.2 | 10 | A |
| Com. Ex. 8 | B | 90 | 10 | 12000 | not flowable | — | — | — | — | — | — | — | — | — | — |
| Com. Ex. 9 | C | 80 | 20 | not flowable | not flowable | — | — | — | — | — | — | — | — | — | — |
| Com. Ex. 10 | — | 100 | 0 | 700 | 730 | 3H | 406 | A | C | 100/100 | 12.3 | 1.6 | 90.4 | 8 | B |
| Com. Ex. 11 | B | 90 | 10 | 1300 | not flowable | — | — | — | — | — | — | — | — | — | — |
| Com. Ex. 12 | C | 80 | 20 | not flowable | not flowable | — | — | — | — | — | — | — | — | — | — |
| Com. Ex. 13 | — | 100 | 0 | 100 | 110 | HB | 260 | C | C | 100/100 | 7.1 | 1.2 | 88.9 | 5 | B |
| Com. Ex. 14 | B | 90 | 10 | 280 | not flowable | — | — | — | — | — | — | — | — | — | — |
| Com. Ex. 15 | C | 80 | 20 | not flowable | not flowable | — | — | — | — | — | — | — | — | — | — |

TABLE 1-continued

| | Resin Composition (wt %) | | Silica Amount (wt %) | Dispersion Viscosity | | Pencil Hardness | Martens Hardness (N/mm²) | Scratch Resistance (250% × 50) | | Blocking Resistance | Adhesiveness | Curling (mm) | Haze of Cured Film (%) | Total Light Transmittance of Cured Film | Folding Resistance of Cured Film (mm) (Mandrel Method) |
| --- | --- | --- | --- | --- | --- | --- | --- | --- | --- | --- | --- | --- | --- | --- | --- |
| | Urethane Acrylate | Resin B | | Initial Viscosity (mPas/ 25° C.) | Viscosity after Acceleration Test (mPas/ 25° C.) | | | Haze before Test | Haze after Test | | | | | | |
| Com. Ex. 16 | R-1901: 100 pts | 0 | 0 | 97,000 | 98,000 | 5H | 311 | 0.9 | 1.0 | C | 100/100 | 5.2 | 0.9 | 91.0 | 3 |
| Com. Ex. 17 | R-1901: 80 pts | 0 | 20 | — | — | — | — | — | — | — | — | — | — | — | — |
| Com. Ex. 18 | R-1901: 50 pts | resin composition of Com. Ex. 4: 50 | | 51,000 | 54,000 | 5H | 383 | 1.2 | 1.2 | A | 100/100 | 4.0 | 1.2 | 90.1 | 3 |
| Ex. 10 | R-1901: 50 pts | resin composition of Ex. 3: 50 | | 3,000 | 3,200 | 5H | 370 | 1.2 | 1.2 | A | 100/100 | 3.9 | 1.2 | 90.2 | 2 |

From the above results, it can be said that the combination of the dipentaerythritol EO adduct acrylate and specific inorganic microparticles for use in the present invention realizes solventlessness while realizing similar high hardness and transparency as that of the combination of a dipentaerythritol hexaacrylate and inorganic microparticles heretofore used in the art. It is considered that the dipentaerythritol EO adduct acrylate for use in the present invention is a crosslinking material that has a high hardness by itself, and functions as a dispersant for stably dispersing inorganic microparticles. Specifically, it is considered that, different from any already-existing crosslinking component, the structure itself of the acrylate has high-level dispersibility for specific microparticles and therefore microparticles corresponding to an inorganic filler can be uniformly dispersed and the hardness of the cured film can be improved while maintaining the above-mentioned advantageous effects. In addition, the dipentaerythritol EO adduct acrylate has a structure with a spacer introduced thereinto, and it is considered that the structure could contribute toward viscosity reduction, low hardening shrinkage such as curling resistance, and flexibility of cured films. It is considered that the crosslinking density would lower in some degree as compared with that of conventional dipentaerythritol acrylates.

INDUSTRIAL APPLICABILITY

As described above, the curable resin composition and the composition for hard coating, which contain inorganic microparticles, of the present invention, containing, as a crosslinkable monomer, the alkylene oxide-modified dipentaerythritol (meth)acrylate represented by the above-mentioned general formulae (I) and (II) where the addition molar number of the alkylene oxide (AO) is optimized and combining it with inorganic microparticles having a mean particle size of from 1 to 150 nm in a specific ratio, have a uniform dispersion with low viscosity and stability thereof and exhibit good curability and low shrinkage, and the cured film thereof has good abrasion resistance and the like. Accordingly, the compositions are suitable for hard coating on a thin-film substrate such as a resin film or any other substrate, and in particular, the step of forming a hard coat layer can be made solventless.

The invention claimed is:

1. A curable resin composition comprising an alkylene oxide-modified dipentaerythritol (meth)acrylate, surface-untreated inorganic microparticles and an optional a solvent,
wherein the alkylene oxide-modified dipentaerythritol (meth)acrylate has a structure represented by formula (I),
wherein the surface-untreated inorganic microparticles are dispersed within the composition, have a mean particle size of from 1 to 150 nm, and are selected from the group consisting of silica, zirconia, germanium oxide, indium oxide, tin oxide, indium tin oxide (ITO), cerium oxide, magnesium fluoride, and sodium fluoride,
wherein the inorganic microparticles comprise from 10 to 45% by weight of the combined weight of the (meth)acrylate and the microparticles in the composition, and
wherein the solvent comprises from 0 to 1% by weight of the curable resin composition,

[Chem. 1]

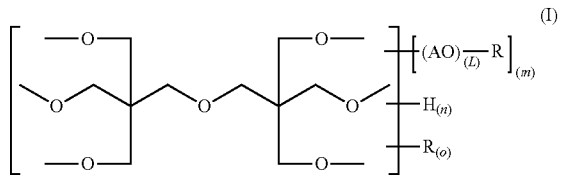

wherein in formula (I), R represents a substituent represented by formula (II), where $R^2$ represents a hydrogen atom or a methyl group,

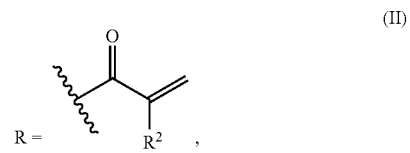

AO represents one member or two or more members selected from alkylene oxide units represented by $-CH_2CH_2O-$, $-CH_2CH(CH_3)O-$, $-CH_2CH_2CH_2CH_2O-$, and $-CH_2CH(C_2H_5)O-$,
L represents a mean degree of polymerization of added alkylene oxide chains and $0 < L \leq 5$,
a mean value of m is more than 0 and 5 or less,
a mean addition molar number L×m of alkylene oxides is $0 < L \times m \leq 5$,
n is 1 or 2,
a mean value of o is 0 or more and 6 or less, and
the total value of m, n and o is 6.

2. The curable resin composition according to claim 1, wherein the mean addition molar number (L×m) of alkylene oxides per 1 mole of dipentaerythritol is from 3 to 5.

3. The curable resin composition according to claim 1, wherein a dispersant component is substantially the alkylene oxide-modified dipentaerythritol (meth)acrylate of formula (I).

4. A resin composition for a hard coating, which is the curable resin composition of claim 1.

5. A method for producing the curable resin composition of claim 1, comprising adding a dispersion liquid comprising the inorganic microparticles and the solvent to the alkylene oxide-modified dipentaerythritol (meth)acrylate, stirring them and removing the solvent.

6. The curable resin composition according to claim 2, wherein a dispersant component is substantially the alkylene oxide-modified dipentaerythritol (meth)acrylate of formula (I).

7. A resin composition for a hard coating, which is the curable resin composition of claim 2.

8. A resin composition for a hard coating, which is the curable resin composition of claim 3.

9. A method for producing the curable resin composition of claim 2, comprising adding a dispersion liquid comprising the inorganic microparticles and the solvent to the alkylene oxide-modified dipentaerythritol (meth)acrylate, stirring them and removing the solvent.

10. A method for producing the curable resin composition of claim 3, comprising adding a dispersion liquid comprising the inorganic microparticles and the solvent to the alkylene oxide-modified dipentaerythritol (meth)acrylate, stirring them and removing the solvent.

* * * * *